United States Patent [19]

Sobolewski

[11] 4,221,172
[45] Sep. 9, 1980

[54] ARTICULATED RAILWAY TRUCK

[76] Inventor: George Sobolewski, Laval West, Canada

[21] Appl. No.: 890,318

[22] Filed: Mar. 27, 1978

[51] Int. Cl.² .......................... B61F 3/08; B61F 5/22; B61F 5/44
[52] U.S. Cl. ............................... 105/168; 105/182 R; 105/199 R; 105/200
[58] Field of Search ................ 104/148 LM; 105/165, 105/166, 167, 168, 171, 182 R, 182 E, 199 R, 200, 202, 224.1

[56] References Cited

U.S. PATENT DOCUMENTS

| 205,956 | 7/1878 | Hamilton et al. | 105/165 |
|---|---|---|---|
| 450,157 | 4/1891 | Hubbard | 105/199 R |
| 450,813 | 4/1891 | Lamb et al. | 105/171 |
| 461,680 | 10/1891 | Hunt | 105/165 |
| 1,046,167 | 6/1913 | Pintner | 105/165 |
| 2,908,230 | 10/1959 | Dean | 105/182 R |
| 3,516,635 | 6/1970 | Lich | 105/133 |
| 3,789,770 | 2/1974 | List | 105/168 |
| 3,799,066 | 3/1974 | Jackson | 105/182 R |
| 4,131,069 | 12/1978 | List | 105/182 R X |

FOREIGN PATENT DOCUMENTS 1018404  10/1977  Canada ................................ 105/168

Primary Examiner—John J. Love
Assistant Examiner—Howard Beltran

[57] ABSTRACT

A railway truck assembly adapted to produce steering of the wheel axles radially to a curve independently of mere lateral motions of the car body to reduce wear and noise and also featuring a pivot connection between the bolster and the truck frame elements which; in cooperation with direct transmission of the load to the truck frame through the opposite ends of the bolster, allows to use a relatively thinner and centrally non-bulging bolster. Thus, more space is made available between the central portion of the bolster and the top of the rails; which space is advantageously used to install some equipment such as for instance a linear induction motor or LIM. This railway truck assembly comprises a bolster which is substantially bodily displaceable with the car body, a pair of side frames, laterally restrained relative to the bolster and supporting the opposite ends respectively of the bolster, a pair of steering yokes longitudinally restrained relative to the car body and pivoted one to the other for radial steering of the wheel axles connected to them respectively, the side frames being slidably supported by the yokes and laterally restrained relative to the latter, and links producing the aforementioned restraints respectively.

8 Claims, 8 Drawing Figures

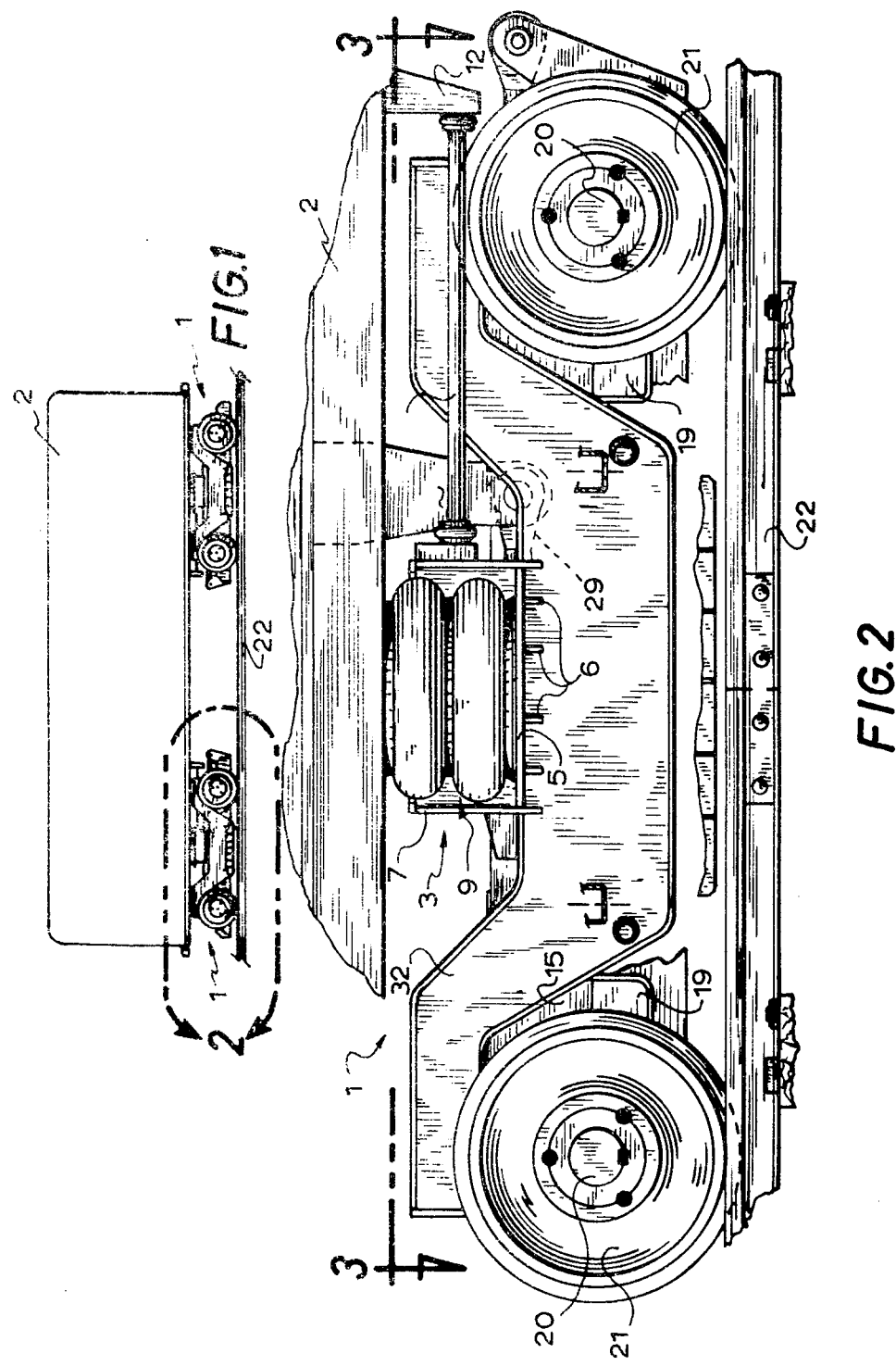

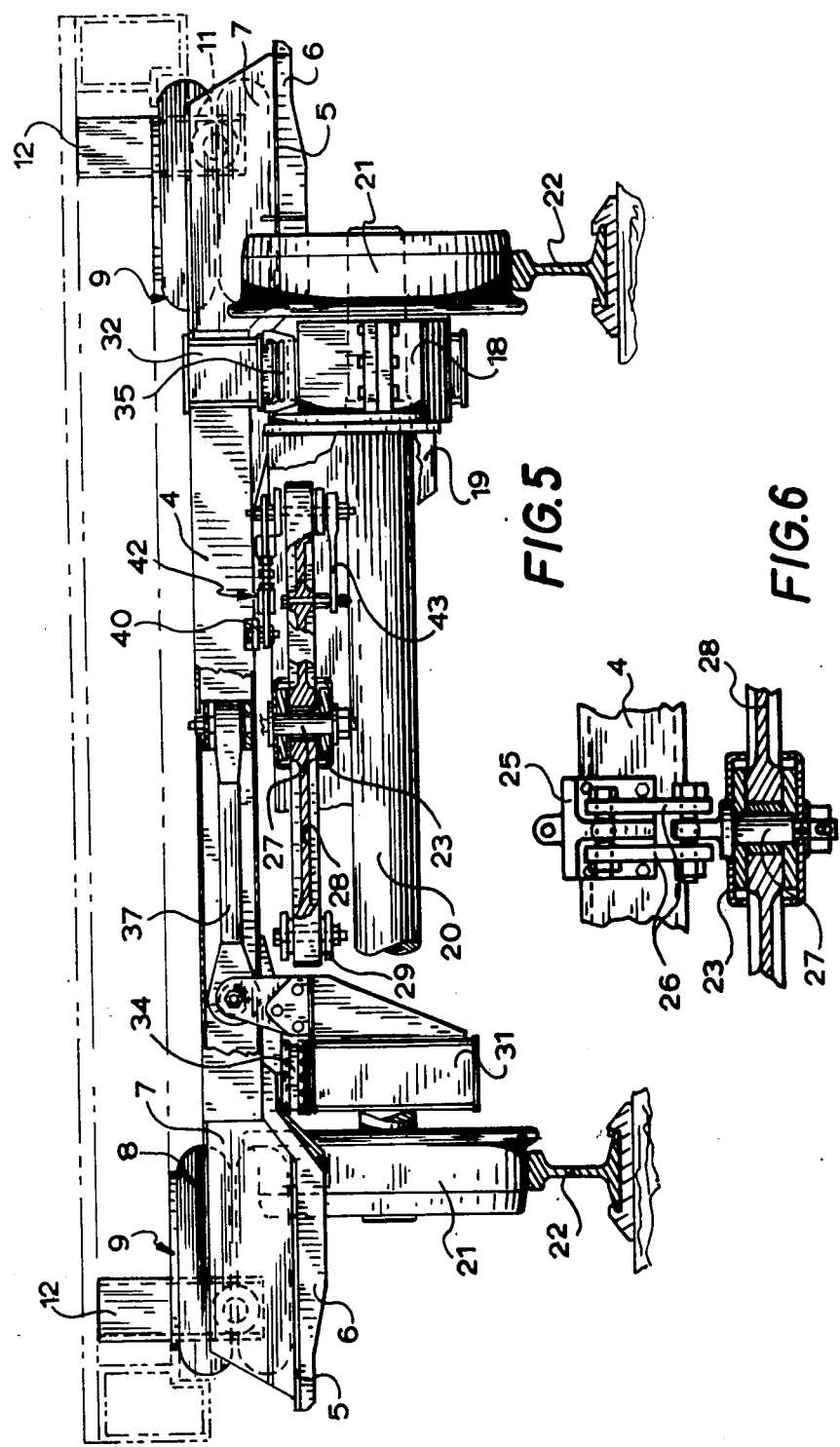

ARTICULATED RAILWAY TRUCK

This invention relates to a railway truck assembly, and more particularly, to the pivotal connection in a railway truck designed for a rapid transit system.

The conventional railway trucks have been designed to meet substantially less stringent requirements than those which have to be met by the trucks for urban rapid transit systems now on the drawing boards and/or under development for the next generation. Such urban transit systems are required to be substantially less noisy, to be able to negotiate curves much sharper than those of conventional railroads, and to be lighter and thus more compatible with energy conservation.

The ability for a railway truck to negotiate relatively sharp curves with a minimum of wear and noise has been provided by steering the wheel axles always radially to the curve. A truck adapted to produce such steering is defined in U.S. Pat. No. 3,789,770. The railway truck of that patent essentially includes a pair of yokes pivoted one to the other about a vertical axis and connected to the wheel axles respectively which by such pivoting will be steered each to a radial position relative to a curve.

It is a general object of the present invention to provide a railway truck of the above type which provides a centerless pivot connection between the bolster and the truck frame elements with that connection arranged to provide suitable underlying space to centrally mount a single motor unit and to allow steering of the wheel axles radially to a curve independently of mere lateral motions of the car body.

It is another object of the present invention to provide a railway truck assembly having a pivot connection which in cooperation with the transmission of the car load directly through the ends of the bolster allows to use thin and non-bulging bolster thereby increasing the underlying central space and reducing the weight of the overall truck assembly.

It is a further object of the present invention to provide a railway truck assembly which takes advantage of the small angular displacements involved to use link connections simply having swivelling rod ends to allow the necessary freedom of pivoting and twisting motions between the movable components.

The above and other objects and advantages of the present invention will be better understood with reference to the following detailed description of a preferred embodiment thereof which is illustrated, by way of example, in the accompanying drawings; in which:

FIG. 1 is a side elevation view of a railway car provided with a pair of railway trucks according to the present invention;

FIG. 2 is a side elevation view of a railway truck assembly according to the present invention as delineated by line 2 in FIG. 1;

Figure 3:
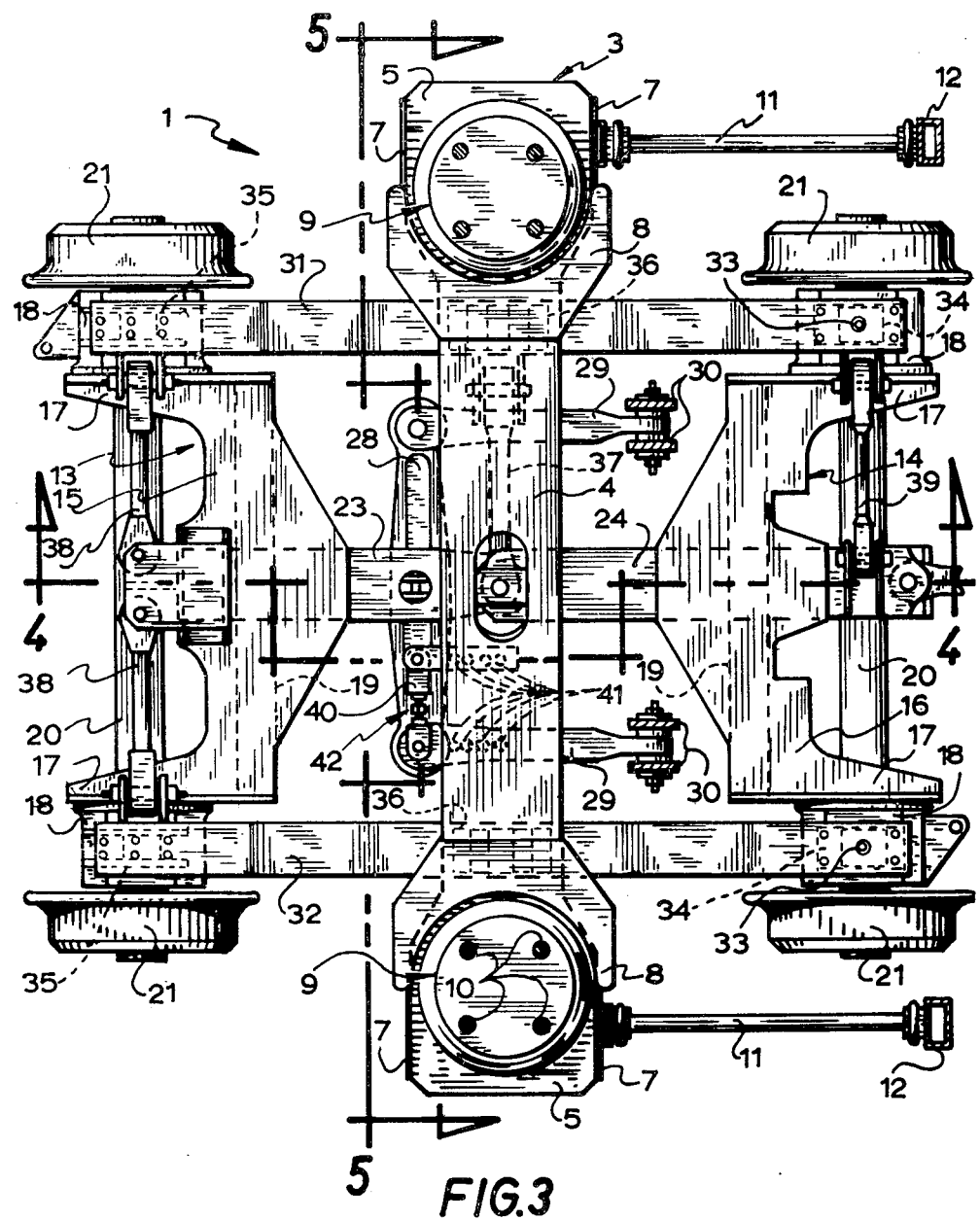
FIG. 3 is a top plan view of the railway truck assembly as seen along line 3—3 in FIG. 2.
Figure 4:
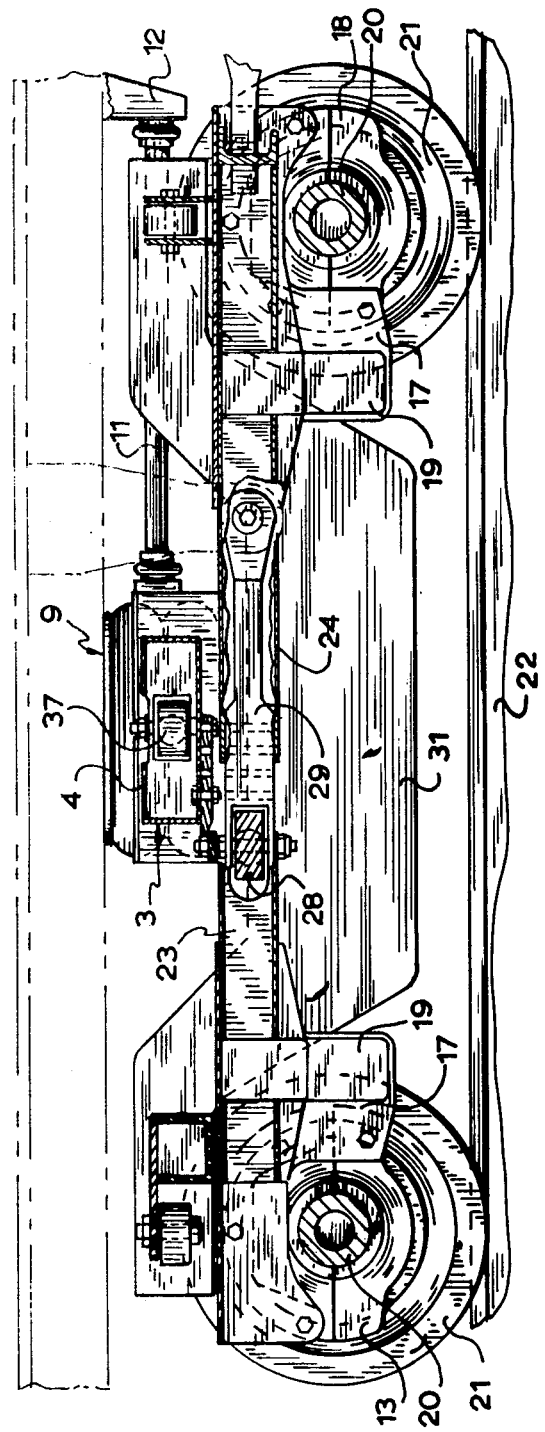
Figure 7:
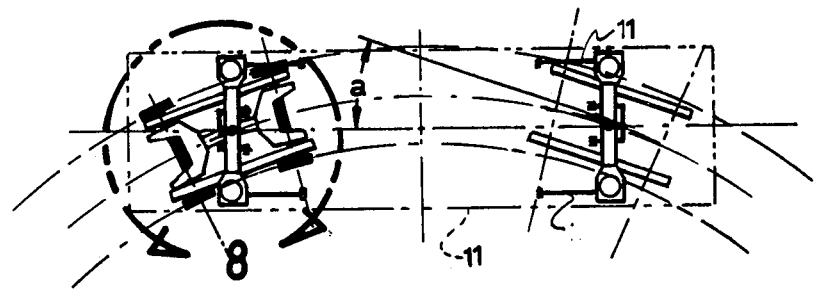
Figure 8:
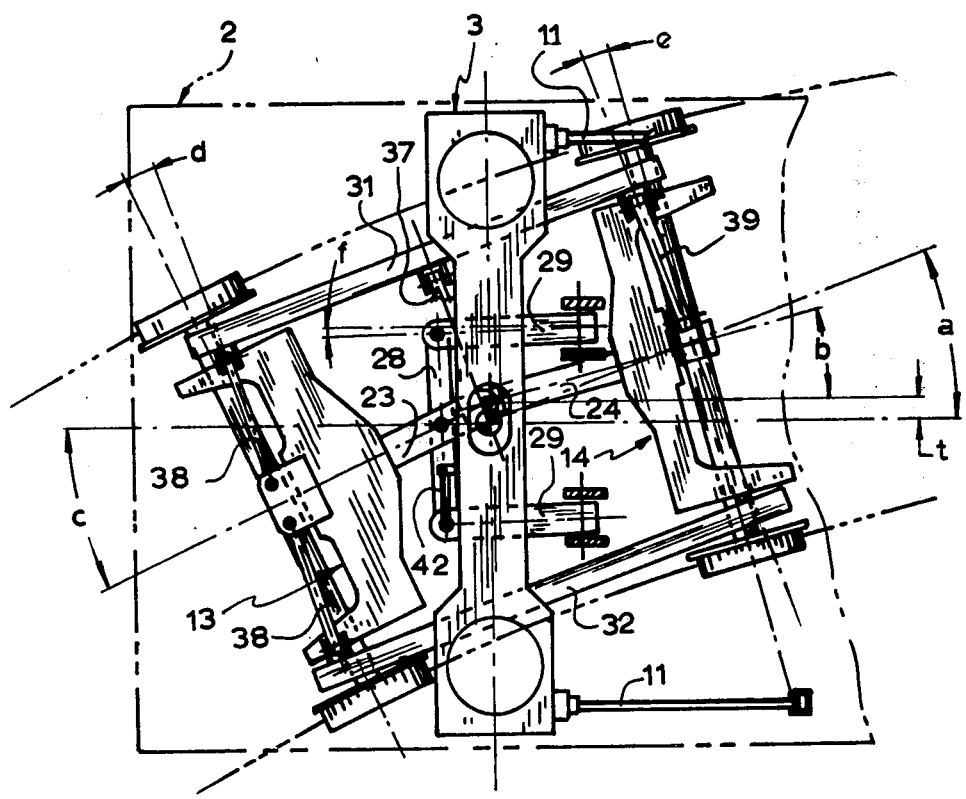

FIGS. 4 and 5 are longitudinal and transverse cross-sectional views as seen along lines 4—4 and 5—5 respectively in FIG. 3;

FIG. 6 is an enlarged detail view of a suspension link and pin assembly as seen along line 5—5 in FIG. 3;

FIG. 7 is a schematic diagram giving in plan view the pivotal relationship between the pivoting elements of a pair of trucks and the railway car body carried by the trucks; and FIG. 8 is an enlarged view of the left truck of FIG. 7 as delineated by line 8.

The railway truck 1 according to the present invention, as shown in FIG. 1, is used in a pair to carry a car body 2 of any desired construction. The railway truck 1 forms part of a railway truck assembly also comprising a bolster 3 and the associated elements to support the car body.

The bolster 3 includes a central portion 4 of tubular construction having a uniform square cross section, as best shown in FIGS. 3 and 4. Each end of the bolster 3 includes a baseplate portion 5 which is positioned lower than the central bolster portion 4. Stiffening ribs 6 are secured against the bottom of each baseplate portion 5 and extend longitudinally of the bolster. Each baseplate portion 5 is provided with a pair of side plates 7 upwardly extending edgewise along the opposite sides thereof. A generally C shape top plate 8 is fixed on the upper edge of each pair of adjacent side plates 7 to cooperatively form with the latter and with the corresponding baseplate portion 5 a protected recess for an air spring unit 9. The latter may be of any appropriate and known construction currently used in the art. The two air springs 9 of each bolster 3 are fixed to the railway car body 2, such as by bolts 10 and carry the load of the corresponding end of the car body. The two side plates 7 on the inboard side of the bolster 3 are connected to the car body 2 by means of a pair of bolster drag links or rods 11. More specifically, each bolster drag link or rod 11 has one end pivoted to the corresponding side plate 7 of the bolster and the other end pivotally connected to a bracket 12 fixedly secured to and downwardly projecting from the bottom of the railway car body. The opposite ends of each bolster drag link 11 are vertically pivoted to accommodate the springing movement between the car body and the bolster and they are also provided with resiliently twisting rod ends to accommodate the very small transverse displacement of the car body relative to the bolster.

The railway truck assembly further includes an outboard and an inboard yokes 13 and 14 respectively. The outboard yoke 13 includes a main frame 15 while the inboard yoke 14 includes a main frame 16. Each main frame 15 and 16 includes a pair of laterally spaced apart projections 17 to which is secured a journal housing 18. Each main frame 15 and 16 is formed with an underlying transverse beam portion 19. The journal housings 18 of each yoke 13 and 14 rotatably retain a wheel axle 20 having a flanged wheel 21 on each of the two opposite outer ends thereof. Thus, the flanged wheels 21 are adapted to carry the yokes and the remainder of the railway truck assembly rollably on rails 22.

The outboard yoke 13 is provided with a longitudinal bar 23 rigidly secured centrally to the main frame 15 and projecting inboard therefrom. Similarly, the main frame 16 is provided with a longitudinal bar 24 which is rigidly secured centrally thereto and projects outboard therefrom. The two bars 23 and 24 have their free end pivoted one to the other at equal distances from the wheel axles 20 and thus, centrally under the bolster 3.

A bracket 25 is fixedly secured against the outboard side of the bolster 3 and at the center thereof. A pair of yoke suspension links 26 are pivoted at the upper end of to the bracket 25 and at the lower end to the head of a vertical pivot pin 27. The latter is arranged to pivotally suspend the free end of the bar 23 of the outboard yoke 13. Due to the above described pivotal connection between the free end of the bars 23 and 24, the pivot pin 27 effectively supports both bars relative to the bolster.

A steering crossbar 28 transversely extends through the yoke bar 23 and is centrally pivoted therein by the pivot pin 27. A pair of yoke drag links or rods 29 are pivotally connected at one end to a corresponding end of the steering crossbar 28 and at the other end to a bracket 30 rigidly depending from the car body 2. Each end of the links or rods 29 is pivotally connected by a resiliently twistable rod end to allow restricted twisting as well as rotation at each such end. It must be noted that the inboard end of each drag link or rod 29 is pivoted about an horizontal axis to allow for the resilient suspension between the car body and the yokes. The other or outboard end of each drag link is pivoted about an upright axis relative to the steering crossbar 28.

A pair of side frames 31 and 32 are positioned on the opposite sides respectively of the railway truck and longitudinally extend parallel one to the other. Each side frame has its inboard end pivoted at 33 on the corresponding journal housing 18 and resting on a resilient pad 34. Each side frame has its outboard end resting on a sliding pad 35. Each end of the bolster 3 rests on a sliding pad 36 at the center of the corresponding side frame. Thus, the load of the railway car 2 is transmitted directly through the air springs 5, and the opposite ends of the bolster 3 onto the sliding pads 36 at the center of the side frames 31 and 32. The sliding pads 35 and 36 allow relative longitudinal displacement between the journal bearings 18 or yokes 13, 14, and between the bolster 3 and the side frame. Such displacement occurs in a curve upon angular displacement of the car body 2 and bolster 3 therewith relative to the side frames and the railway truck as a whole. As will be explained later, the angular displacement of the truck relative to the car body steers the yokes 13, 14 to align the wheel axles 20 radially to the curve. Such steering displacement of the yokes results in relative sliding between the yokes and the side frames 31, 32 on the sliding pads 35.

A lateral stabilizing link or rod 37 extends laterally of the truck and is pivotally connected to the central portion of the bolster 3 and to the side frame 31. This anchor rod or link 37 accurately restrains the side frame 31 in lateral direction. A set of three yoke centering links 38, 38, 39 extend laterally and are pivotally connected at one end to one end of a side frame and at the other end, near the center line of the corresponding yoke. These links 38, 38 and 39 are provided to center the side frames 31, 32.

The steering actuation device to actuate the steering crossbar 28 comprises an arm 40 which is fixedly secured to the central portion 4 of the bolster and extends longitudinally of the railway car body 2. Each of this arm 40 and the adjacent drag link 28 is provided with a series of adjustment holes 41 spaced apart along the length thereof. An adjustable link 42 is pivotally connected in any one of the holes 41. A stabilizing link 43 is connected parallel to and under the crossbar 28 to stabilize the pivot pin through the end of the cross-bar to resist the action thereon by the actuating link 42.

The operation of the railway truck assembly will now be explained in details with particular reference to FIGS. 7 and 8. When the railway car is in a curve, the body 2 thereof comes at an angle "a" relative to the longitudinal axis of the railway truck 1. Since the bolsters 3 are restrained relative to the car body, they also make the same angle relative to the trucks 1.

The reference link 42 acts to keep the steering crossbar 28 laterally centered with respect to the car body. This will shift the yoke sufficiently with respect to the truck center line to pivot both yokes 13 and 14 in opposite directions such that both wheel axles 20 will take a radial alignment relative to the curve.

It must be noted that when the steering actuator or reference link 42 is in the predetermined position of alignment with the steering crossbar 28, as shown in FIG. 3, the mere lateral motion of the car body, as may be caused by irregularities in the railway truck, merely laterally shifts the pivotal connections to the brackets 30 and laterally pivots the drag links 29 about their other end. Since the bolster and link 42 then do not move with the car body the vertical alignment and connection of the outer end of the link 42 with the corresponding end of the steering crossbar 28 causes the outer end to operate as a fulcrum for the corresponding drag link 29. Thus, the steering crossbar 28 is not displaced endwise transversely of the car body when the latter is subjected to mere lateral motions. If however it is desired for any particular application such as to a freight car, the reference link 42 could be connected into another pair of holes 41. In such case, the fulcrum thus provided by the outer end of link 42 that is connected to the drag link 29 produces a predetermined leverage action to laterally displace the steering crossbar in response to even more lateral motions of the car body.

Although the curves for a rapid transit system are sharper than those for the conventional railroads, the maximum steering angle of each wheel axle 20 is limited to about 2¼ degrees. FIGS. 7 and 8 are exaggerating the relative angular pivoting between the pivotable components. In fact, the bars 23 and 24 only slightly shift laterally and thus the upright pivot between the two only slightly shifts sideways from alignment with the pivot center of the trucks relative to the car body.

What is claimed is:

1. A railway truck assembly to carry one end of a car body and comprising: a bolster defining opposite ends operatively aligned transversely relative to the car body; bolster drag links operatively connecting the opposite ends of the bolster to the railway car body to prevent a relative yawing motion; a pair of spring suspensions positioned on the opposite ends of the bolster and operatively carrying the corresponding end of the car body; a pair of wheel axles including an inboard and an outboard wheel axles defined by the corresponding inboard and outboard positions thereof respectively relative to the car body; an inboard and an outboard steering yokes rotatively holding the inboard and outboard wheel axles respectively and pivoted in yaw one to the other at a point intermediate the wheel axles; a pair of side frames positioned at the opposite ends respectively of the bolster and having opposite ends resting onto said yokes respectively; pivot means pivotally connecting one end of each side frame on one of said yokes; lateral link means pivotally connecting and laterally restraining each side frame relative to each yoke and to the bolster; a steering crossbar and cooperatively and entirely transmitting all the longitudinal loads between the car body and the yokes having a central portion pivotally connected to the outboard yoke; a swivelling connection pivotally suspending said central portion to said bolster; a pair of yoke drag links longitudinally extending lengthwise of the car body on opposite sides respectively of said swivelling connection and pivotally connected at one end to the car body and at the other end to the opposite ends respectively of the steering crossbar; and a steering actuator link selectively connecting in a predetermined position of alignment with the steering crossbar and pivotally at one end relative to the bolster and at the other end relative to the steering crossbar, thereby allowing mere lateral motions of the car body to substantially produce no relative translation motion of the steering crossbar endwise transversely of the car body.

2. A railway truck assembly as defined in claim 1, wherein said lateral link means includes a lateral anchor link pivotally connected at one end to the bolster and at the other end to one of the side frames.

3. A railway truck assembly as defined in claim 2, wherein said bolster drag links are pivotally connected at one end to the railway car body on one side of the bolster and are pivotally connected at the other end to the opposite ends respectively of the bolster.

4. A railway truck assembly as defined in claim 3, wherein said one end of the yoke drag links are connected to the railway car body on said one side of the bolster, said yokes are positioned on the opposite sides respectively of the bolster, said steering crossbar is pivoted to the yoke on the opposite side of said bolster relative to said one side thereof, and said other end of the yoke drag links are pivotally connected to the opposite ends of the steering crossbar on said opposite side of the bolster.

5. A railway truck assembly as defined in claim 1, further including sliding pads interposed between the top of said side frames and the opposite ends respectively of the bolster, between said yokes and the bottom of said side frames, and allowing sliding of said side frames relative to said bolster and of said wheel axles and yokes relative to said side frames.

6. A railway truck assembly as defined in claim 5, wherein said lateral link means includes centering links transversely extending relative to the side frames and each having one end pivotally connected to one side frame and the other end pivotally connected to a corresponding yoke.

7. A railway truck assembly as defined in claim 6, further including sliding pads interposed between the top of said side frames and the opposite ends respectively of the bolster, between said yokes and the bottom of said side frames, and allowing sliding of said side frames relative to said bolster and of said wheel axles and yokes relative to said side frames, said lateral link means including yoke centering links transversely extending relative to the side frames and each having one end pivotally connected to a side frame and the other end pivotally connected to a corresponding yoke, a pin pivotally joining said steering crossbar to said other yoke about a vertical axis and a support link pivotally suspended to said bolster, pivotally connected to said pin, and pivotally positioning said yokes and crossbar vertically with respect to the bolster.

8. A railway truck assembly as defined in claim 1, wherein said swivelling connection includes a pin pivotally joining said steering crossbar to the outboard yoke about a vertical axis, and a support link pivotally suspended to said bolster, pivotally connected to said pin, and pivotally positioning said yokes and crossbar vertically with respect to said bolster.

* * * * *